(12) United States Patent
Barton

(10) Patent No.: US 6,759,762 B2
(45) Date of Patent: Jul. 6, 2004

(54) DEVICE FOR CONTROLLING POWER DISTRIBUTION TO SUBSYSTEMS

(75) Inventor: Bruce Barton, Huntington, NY (US)

(73) Assignee: Bits LTD, Northport, NY (US)

( * ) Notice: Subject to any disclaimer, the term of this patent is extended or adjusted under 35 U.S.C. 154(b) by 233 days.

(21) Appl. No.: 10/143,004

(22) Filed: May 10, 2002

(65) Prior Publication Data

US 2003/0209943 A1 Nov. 13, 2003

(51) Int. Cl.[7] .............................................. H02J 1/00
(52) U.S. Cl. ........................................................ 307/39
(58) Field of Search ........................ 307/38, 39, 41, 307/113, 115, 116, 125, 126, 130, 131, 154, 155

(56) References Cited

U.S. PATENT DOCUMENTS

| | | | | |
|---|---|---|---|---|
| 4,731,549 A | * | 3/1988 | Hiddleson | 307/125 |
| 4,825,140 A | * | 4/1989 | St. Louis | 323/237 |
| 4,970,623 A | * | 11/1990 | Pintar | 361/187 |
| 5,541,457 A | * | 7/1996 | Morrow | 307/38 |
| 5,565,714 A | * | 10/1996 | Cunningham | 307/112 |
| 5,923,103 A | * | 7/1999 | Pulizzi et al. | 307/126 |
| 6,501,195 B1 | * | 12/2002 | Barton | 307/125 |
| 6,528,902 B1 | * | 3/2003 | Barton | 307/39 |

* cited by examiner

Primary Examiner—Matthew V. Nguyen
(74) Attorney, Agent, or Firm—I. Zborovsky

(57) ABSTRACT

A device for controlling a power distribution to subsystems, comprising a power input to be connected to a power source; a primary power output to be connected to a primary device; at least one secondary power output to be connected to at least one secondary device; sensing means for sensing when a current level falls below a threshold in response to the primary device being turned off and when the current level raises above a threshold in response to the primary device being turned on; executing means operatively connected with said sensing means and operative for interrupting a power supply to said at least one secondary device when the sensing means sense the current level below the threshold and supplying power to said at least one secondary device when said sensing means sense the current level above the threshold correspondingly; power limiting means for limiting voltage across said sensing means; and a low current operating means which increases the voltage to provide triggering of said executing means despite the limiting of the voltage by the said power limiting means.

2 Claims, 3 Drawing Sheets

DEVICE FOR CONTROLLING POWER DISTRIBUTION TO SUBSYSTEMS

BACKGROUND OF THE INVENTION

The present invention relates to devices for controlling a distribution of power to subsystems, for example to a main device and at least one secondary device or a plurality of secondary devices.

More particularly, the present invention relates to the above mentioned devices formed as electrical power strips and power control sensors which can be used with new devices having two modes of operation, standby or off and full on, with the use of main device or secondary devices.

One type of an electrical distribution device is the power strip or power control center, which generally comprises of a row of power outlets, switched or unswitched, to distribute power to a primary device and secondary device(s) from a standard outlet (e.g., wall outlet). Some power strips and control centers contain options like circuit breakers, fuses and/or surge protectors, for example.

In newer personal computers the system can turn itself off and is controlled by the operating system. During the system shutdown, there is a delay in which the operator must wait for the system to finish before turning off the secondary device(s). Depending on the operating software and programs, this can be a long time. Using this invention, the user may leave after the shutdown is started. When the system finishes and switches off or to the standby mode, the secondary device(s) will be turned off.

When used with computer devices, each device is plugged into a separate outlet with the computer plugged into the main outlet. When the computer is turned on, the current level increases to a high enough level to turn on the secondary device(s). Other constant power outlets may also be included for wake up devices, such as modems capable of bringing the system out of standby mode.

U.S. Pat. No. 4,731,549; U.S. Pat. No. 4,825,140 and U.S. Pat. No. 4,970,623 are methods for controlling secondary device(s). All require internal power supplies and many components, making them too expensive for mass production and difficult to fit in a standard power strip.

Some improved solutions are disclosed in our patent applications Ser. Nos. 09/521,029; 09/553,355; 09/953,743.

SUMMARY OF THE INVENTION

Accordingly, it is an object of present invention to provide a device for controlling distribution of power to subsystems, which avoids the disadvantages of the prior art.

In keeping with these objects and with others which will become apparent hereinafter, one feature of present invention resides, briefly stated, in a device for controlling a power distribution to subsystems which has a power input to connected to a power source, a primary power output to be connected to a primary device, at least one secondary power output to be connected to at least one secondary device; sensing means for sensing when a current level falls below a threshold in response to the primary device being turned off and when the level current raises above a threshold in response to the primary device being turned on; and executing means operatively connected with said sensing means and operative for interrupting a power supply to said at least one secondary device when the sensing means sense the current level below the threshold and supplying power to said at least one secondary device when said sensing means sense the current level above the threshold. A power limiting means for limiting voltage across said sensing means and a low current operating means which increases the voltage to provide triggering of said executing means despite the limiting of the voltage by said power limiting means.

By using power limiting means with a low voltage drop, the heat produced at high current draws though the main power output will be small, allowing the device to be placed in smaller housing.

In accordance with the invention a power limiting means include two diodes which are arranged in opposite directions across said sensing means.

Also in accordance with the invention a low current operating voltage increasing means include a voltage divider means.

In accordance with a further embodiment of the present invention, the sensing means can be formed as a current sensing resistor arranged in series with a power input of the device.

The executing means can be formed for example as a DC relay, as an AC relay, as a solid state AC relay, etc.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
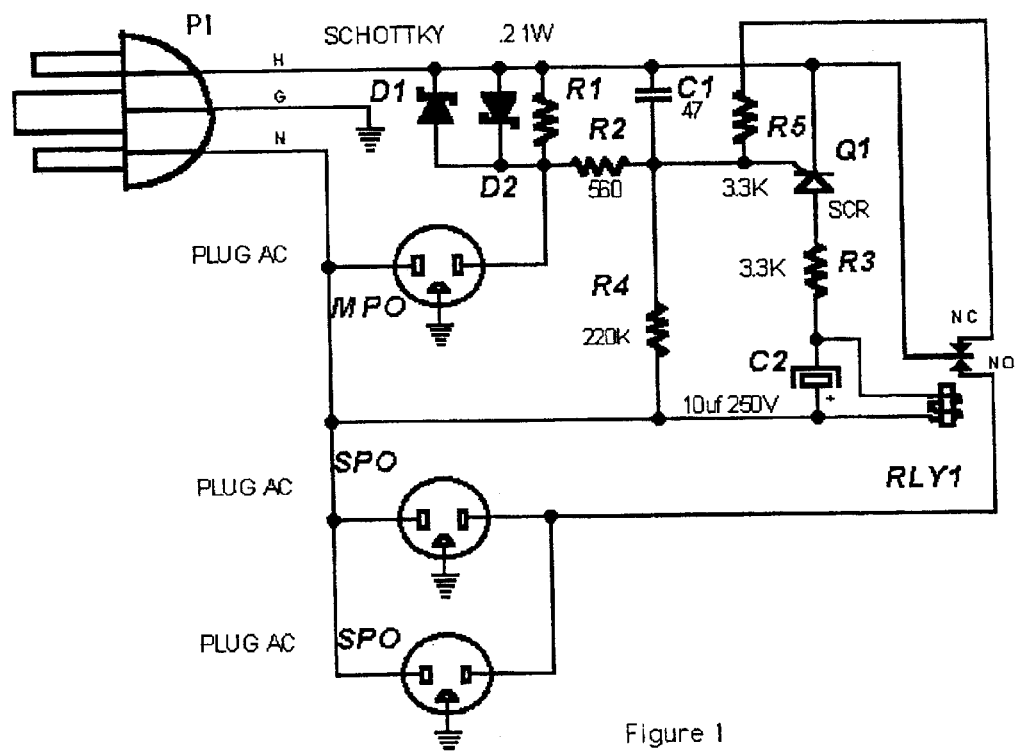
FIG. 1 is a view showing a device for controlling a power distribution to subsystems in accordance with one embodiment of the present invention.

A device for distributing power to subsystems in accordance with one embodiment of the present invention as shown in FIG. 1 has a power input (PI) which is connectable to an AC power source. A current sensing resistor (R1) is arranged in series with the power input (PI). It converts the current drawn by a main system or device connected to a main power output (MPO), into a voltage. Diodes (D1 and D2) are placed in parallel with the resistor (R1) to limit the power to the resistor, by limiting the voltage on the resistor to a schottky diode drop or about 0.35 volts. By using diodes with a low voltage drop, the heat produced at high current draws though the main power output (MPO) will be small, allowing the device to be placed in smaller housing. The diodes (D1 and D2) are placed in both directions because the current through the resistor (R1) may be alternating.

A voltage divider is formed by two resistors (R2 and R4) so that a small voltage, about 0.4 volts peak, is formed across the gate bias resistor (R2). This voltage is small enough as not to trigger the gate of the SCR (Q1). The resistors (R2 and R4) form a means for increasing the voltage to provide triggering of the executing means despite the limiting of the voltage by the diodes (D1 and D2).

The gate bias resistor (R2) and the capacitor (C1) form a time constant to filter out line noise and prevent false triggering of the SCR (Q1).

When the voltage across the current sensing resistor, created by the main device power level, plus the voltage across the bias resistor (R2), exceeds the gate trigger voltage of the SCR (Q1), the SCR (Q1) will switch on. Current now flows through the SCR (Q1), current limiting resistor (R3) to charge the capacitor (C2). The current limiting resistor (R3) limits the current to the SCR (Q1) as well as forming a resistive capacitive time constant to slow down the charging the capacitor (C2). This helps prevent false triggers as well as creating a turn on time delay for secondary systems system(s), if wanted.

The energy now stored in capacitor (C1) turns on a relay (RLY1) to control power supply to secondary power outputs (SPO), to which the secondary system (device) or secondary systems (devices) are connected.

A hysteresis resistor (R5) is used to lower the voltage across the gate bias resistor (R2) when the relay (RLY1) is off. When the relay is on, one side of the hysteresis resistor (R5) is disconnected, increasing the voltage across the gate bias resistor. This prevents oscillation of the relay (RLY1) if the main device power level is close to the threshold of the sensing means.

In the above described embodiment the current sensing resistor (R1) together with the gate bias resistor (R2) and the SCR (Q1) constitute sensing means which sense a current level below or above a predetermined threshold, while the relay constitutes executing means which, in response to the sensing of the current level by the sensing means interrupts the current supply to the secondary device(s) when the sensed level is below the threshold as a result of turning off of the primary device or supplies the current to the secondary device(s) when the current level sensed by the sensing means is above the threshold as a result of turning on of the primary device.

Figure 2:
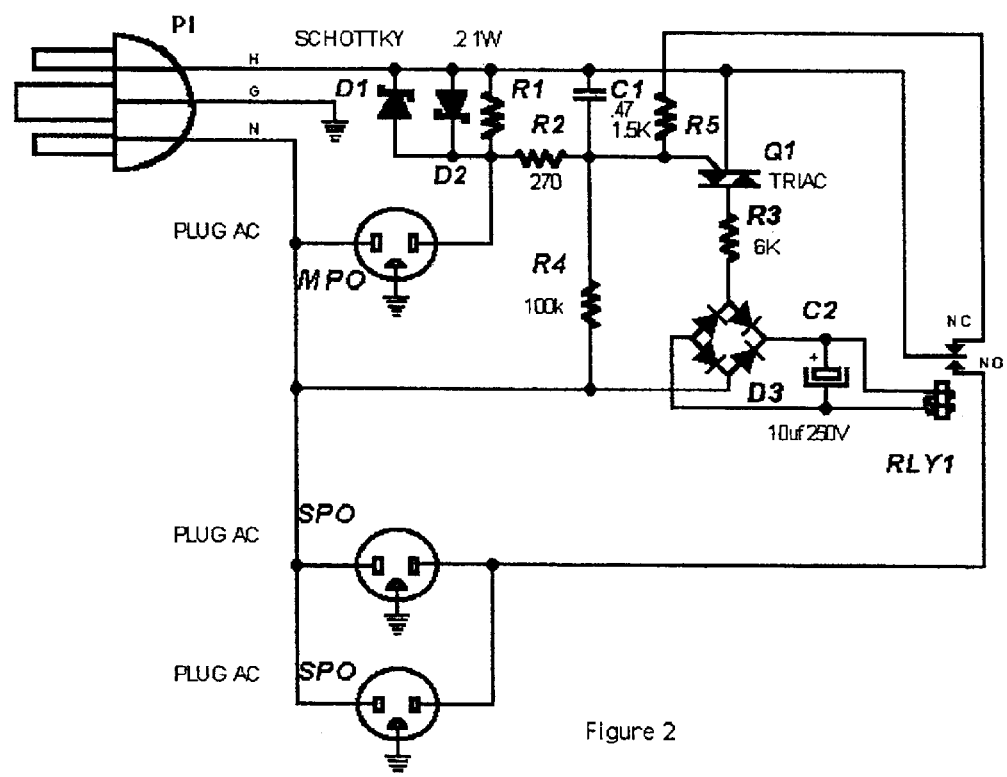
FIG. 2 is a view showing the inventive device in accordance with another embodiment of the present invention.

FIG. 2 shows another embodiment of the inventive device. It substantially corresponds to the embodiment of FIG. 1. However, in the device in accordance with the embodiment of FIG. 2, the triggering device SCR (Q1) has been replaced by a triac (Q1). If a dc relay is used, a rectifier must be used. In FIG. 2 a bridge rectifier (D3) is used.

Figure 3:
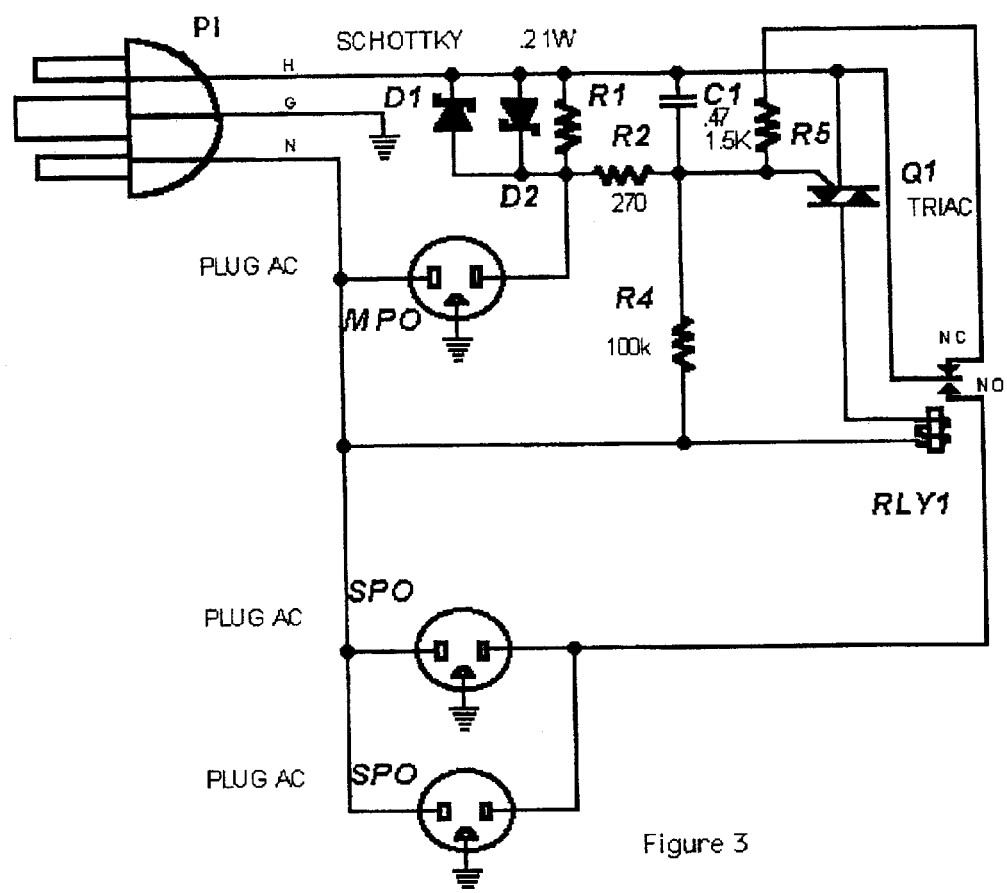
FIG. 3 is a view showing the inventive device in accordance with still a further embodiment of the present invention.

FIG. 3 shows another embodiment of the device in accordance with the present invention. In this embodiment the output of the triac (Q1) is feed directly to an AC relay.

It is to be understood that the device in accordance with the present invention can be used on many different voltages by changing the resistor values, including but not limited to 100, 120 and 220 Vac, for domestic and international use.

Instead of the SCR(Q1) transistors or other switching devices can be used. Also, separate diodes can be used instead of the diode bridges. The diodes (D1 and D2) also can be replaced by any voltage limiting device.

It will be understood that each of the elements described above, or two or more together, may also find a useful application in other types of constructions differing from the types described above.

While the invention has been illustrated and described as embodied in device for controlling power distribution to subsystems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling a power distribution to subsystems, comprising a power input to be connected to a power source; a primary power output to be connected to a primary device; at least one secondary power output to be connected to at least one secondary device; sensing means for sensing when a current level falls below a threshold in response to the primary device being turned off and when the current level raises above a threshold in response to the primary device being turned on; executing means operatively connected with said sensing means and operative for interrupting a power supply to said at least one secondary device when the sensing means sense the current level below the threshold and supplying power to said at least one secondary device when said sensing means sense the current level above the threshold correspondingly; power limiting means for limiting voltage across said sensing means; and a low current operating means which increases the voltage to provide triggering of said executing means despite the limiting of the voltage by the said power limiting means.

2. A device as defined in claim 1, wherein said executing means includes a DC relay.

* * * * *